INVENTOR.
Orville R. Steele
BY Adam E. Fisher
ATTORNEY.

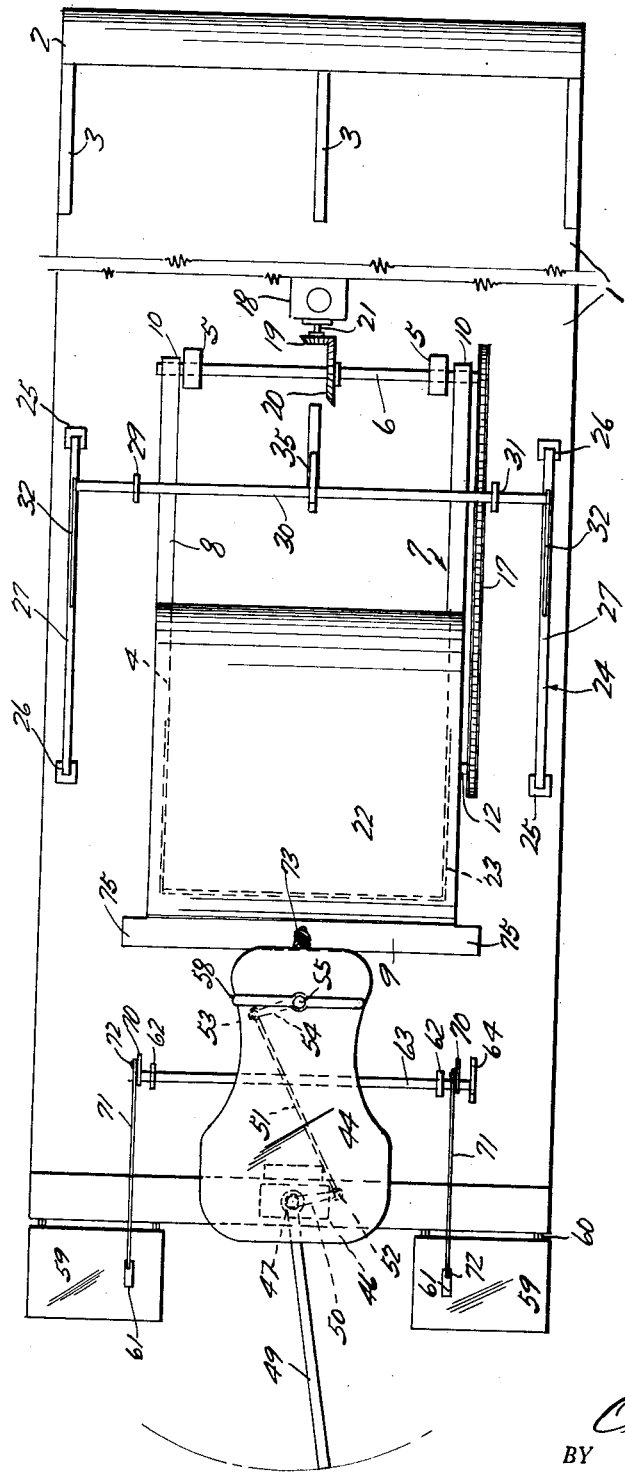

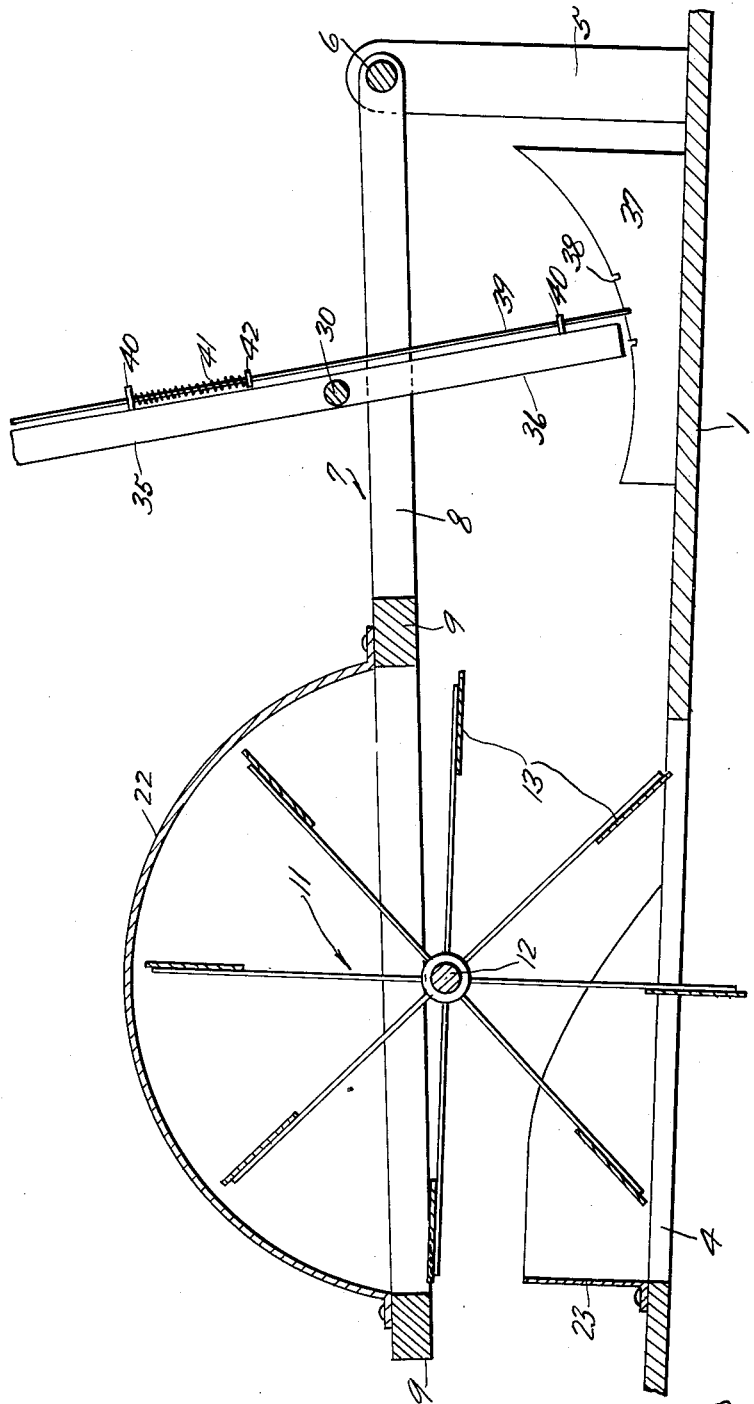

Patented July 4, 1933

1,916,643

UNITED STATES PATENT OFFICE

ORVILLE R. STEELE, OF COVINGTON, VIRGINIA

SNOW VEHICLE

Application filed December 7, 1931. Serial No. 579,514.

The present invention relates to vehicles especially adapted for traveling upon and over snow.

One object is to provide a vehicle for such purpose constructed in a relatively compact, durable and efficient form.

Another object is to provide a vehicle having a toboggan-like base, with an open medial portion, a propeller in the form of a peddle wheel pivotally mounted through the open medial portion in such a way that the wheel may be raised or lowered in the operation of the vehicle for the purpose of diminishing or increasing the paddle contact with the snow surface over which the vehicle may be traveling.

Another object is to provide a vehicle of the kind described, the same having means for preventing lateral slippage, separate means in the way of a brake for preventing longitudinal slippage, and still additional separate means for steering the vehicle.

With these and such other and further objects in view as may be developed in the course of the following specification, a preferred embodiment of the invention is illustrated in the accompanying drawings, and wherein Figure 1 is a side elevation of the vehicle, a forward section of the toboggan base being broken out;

Figure 2 is a plan view conforming to the view of Figure 1;

Figure 3 is an enlarged longitudinal section through the medial portion of the vehicle.

Figure 1:
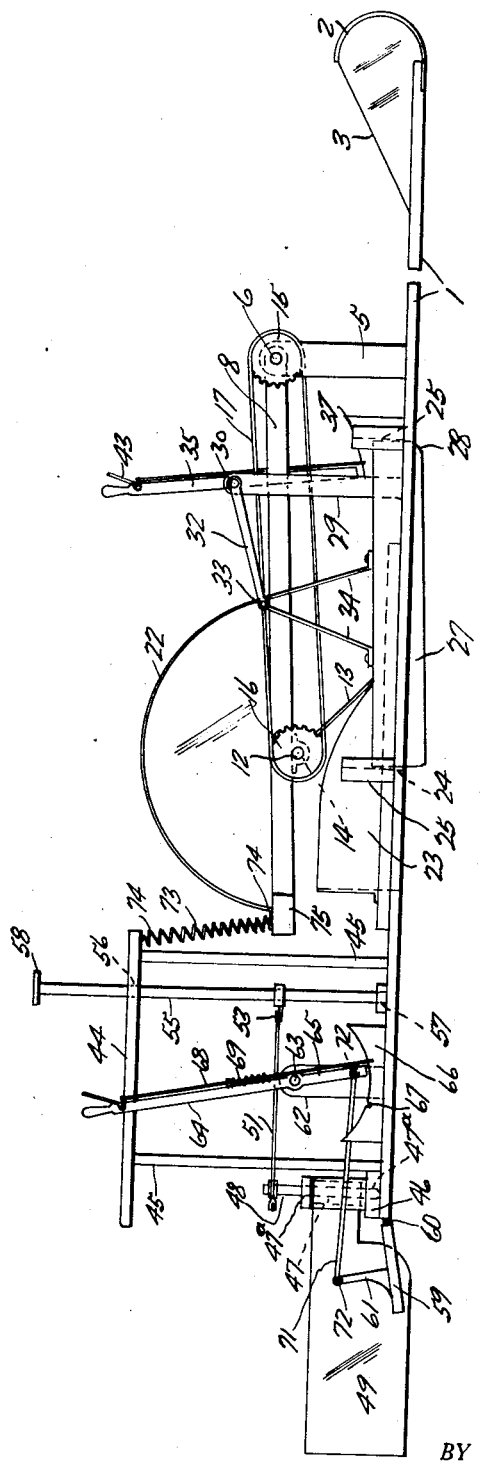

The invention comprises an elongated toboggan-like base 1, having an upturned or rounded bow piece 2, supported by means of braces 3, and the medial portion of the floor of the base being cut away to provide a wheel opening 4. Forwardly of this opening are a pair of laterally spaced uprights 5 across the upper ends of which is journaled a drive shaft 6. A rectangular wheel frame 7 made up of the side members 8 and cross braces 9 is journaled at its forward end upon the extended ends of the shaft 6, exteriorly of the uprights 5, as shown at 10. The cross braces 9 of the frame are arranged to register in a vertical direction with the forward and rear margins of the wheel opening 4. A paddle wheel 11, comprising an axle 12 and radially mounted paddles 13, is mounted immediately above the opening 4, the extended ends of the axle being journaled in place underneath the longitudinal members 8 and secured in place by means of straps 14. Thus the raising or lowering of the frame 7 will in turn raise or lower the axle 12 and paddles 13 through the opening 4. Aligned sprockets 15—16 are rigidly mounted at the extended ends of the shafts 6 and 12 and a sprocket chain 17 is trained thereover. A motor 18 is mounted forwardly upon the base 1 and mating bevel gears 19 and 20 are rigidly mounted upon the drive shaft 21 of the motor and the shaft 6 respectively, whereby the paddle wheel 11 may be driven. A semi-cylindrical guard 22 is mounted upon the frame 7 immediately over the wheel 11 to prevent snow being thrown up, and lower snow guard strips 23 are mounted upon the base 1 along the side and rear margins of the wheel opening 4. Elongated fluke or runner slots 24 are cut through the lateral margins of the base 1 medially of the ends thereof and posts 25 are mounted at the ends of these slots, the said posts having slide-ways 26 formed on their inner sides and fastening the ends of the said slots. Thin, elongated flukes or runners 27 are slidably mounted at their ends within the said slide-ways of the posts 25 and are thus adapted to be moved up or down in a vertical direction between said posts. The forward ends of the flukes are rounded off as shown at 28 so as to not hinder the forward motion of the vehicle. It is apparent that when these flukes are depressed through the slots 24, they will serve as effective stops against lateral slippage of the vehicle. As means for thus manipulating these flukes, uprights 29 are mounted laterally upon the base 1 just within the forward ends of the slots 24 and a fluke shaft 30 is journaled at its ends upon these uprights, as shown at 31. Arms 32 are extended rearwardly from the shaft and the ends of these arms are pivotally connected at 33 with brackets 34 anchored upon the upper edges of the flukes 27. A hand lever 35 extended medially from the shaft 30 affords means for raising or lowering the flukes as may be desired. In order to lock the flukes to any set position, the lever 35 is extended downwardly as shown at 36 and adapted to move within a segmental anchor block 37 having a series of notches 38 cut therein. A lock rod 39 is then slidably mounted through loops 40 upon the lever, and an expansive coil spring 41 braced between the upper loop 40 and the lug 42 permanently mounted upon the rod 39, normally urges the rod downward into contact with the block 37. The rod 39 is controlled through a finger piece 43 pivotally mounted in conventional form at the upper end of the lever. Thus the depth of the set of the flukes 27 may be easily governed through the lever 35 and they may be locked at any desired point by merely inserting the lower end of the rod 39 in the required one of the notches 38. A seat 44 is provided at the rear of the vehicle, the same being supported upon posts 45. A rudder frame 46 is provided at the rear end of the base and a rudder block 47 is journaled vertically therein as shown at 47a, the upper end being extended up through the frame as shown at 48. A rudder 49 is secured by its reduced forward end to the said rudder block. A rudder arm 50 is extended laterally from the upper end of the rudder block. A connecting rod 51 is pivoted at its rear end to the rudder arm as shown at 52, the free end being extended diagonally forward as shown in Figure 2, and pivotally connected at 53 with an arm 54 extended from a steering post 55 journaled through the seat 44 as shown at 56 and having its lower end journaled in the base 1 as shown at 57. A steering arm 58 is mounted at the upper end of the post 55, and thus the vehicle may be guided laterally as desired. Brake blocks or fins 59 are pivoted at 60 to the rear end of the base at each side of the rudder, and brake arms 61 are extended from the upper faces of these blocks. Uprights 62 are mounted adjacent the rear end of the base 1 and a brake shaft 63 is journaled across the upper ends thereof. A hand lever 64 is secured to the outer extended end of this shaft and the lower end 65 thereof moves over a segmental anchor block 66 which is fastened to the base 1 at one side thereof. This anchor block carries a series of slots 67 into which the lower end of the rod 68 plays, the said rod being slidably mounted upon the lever 64 and normally urged downward by a spring 69 in manner identical with the arrangement of the other described lever 35, the arrangement, mounting and functioning of these two levers being identical in all respects. Arms 70 depend at each end of the shaft 63 and connecting links 71 have their ends pivotally connected as shown at 72 with the extremities of the arms 61 and 70. By this arrangement the fins may be raised for permitting the straight away movement of the vehicle or they may be depressed as a brake to prevent such movement. A strong retractile coil spring 73 is connected at its ends with the forward end of the seat 44 and the rear cross piece 9 of the wheel frame 7, as shown at 74, the ends of the said cross piece being extended laterally to form foot rests 75.

In use the spring 73 will normally raise the paddle wheel 11 to its inoperative position, but as the operator bears down upon the foot rests 75, the paddle wheel is depressed and the paddles 13 are caused to eat into the snow underneath, thus causing the vehicle to move forward. As above stated, by depressing the flukes 27 lateral movement is prevented, and by depressing the brake fins 59, the vehicle may be stopped or slowed down. Steering is done through the movements of the rudder 49.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a snow vehicle in combination, a toboggan-like base having a medial aperture cut out forming a wheel-way, a wheel frame pivotally mounted at its forward margin over the wheel-way and adapted to vibrate vertically, a paddle wheel journaled in the frame and adapted to play through the wheel-way, resilient means for normally supporting the wheel frame and wheel in a raised position, means for driving the paddle wheel, runners laterally arranged and adapted to vibrate vertically, means for raising or lowering the runners, a rudder and controlling means therefor, braking fins hinged at the rear of the base and controlling means for the said fins.

In testimony whereof I affix my signature.

ORVILLE R. STEELE.